(12) United States Patent
Berger et al.

(10) Patent No.: US 12,474,220 B2
(45) Date of Patent: Nov. 18, 2025

(54) UNIT FOR HIGH-TEMPERATURE USES

(71) Applicant: SCHOTT AG, Mainz (DE)

(72) Inventors: Florian Berger, Essenbach (DE); Christian Mix, Landshut (DE); Ina Filbert-Demut, Pilsting (DE); Thorsten Wilke, Nack (DE)

(73) Assignee: SCHOTT AG, Mainz (DE)

( * ) Notice: Subject to any disclaimer, the term of this patent is extended or adjusted under 35 U.S.C. 154(b) by 742 days.

(21) Appl. No.: 17/849,433

(22) Filed: Jun. 24, 2022

(65) Prior Publication Data

US 2022/0412808 A1     Dec. 29, 2022

(30) Foreign Application Priority Data

Jun. 24, 2021    (DE) ...................... 10 2021 116 345.5

(51) Int. Cl.
     *G01K 1/08*          (2021.01)
     *G01F 1/68*          (2006.01)
     (Continued)

(52) U.S. Cl.
     CPC ............... *G01K 1/08* (2013.01); *G01K 7/00* (2013.01); *H05B 3/08* (2013.01); *G01F 1/68* (2013.01);
     (Continued)

(58) Field of Classification Search
     CPC . G01K 1/08; G01K 7/00; H01C 7/006; H01C 7/008; H01C 7/021; H05B 3/08;
     (Continued)

(56) References Cited

U.S. PATENT DOCUMENTS 5,137,582 A *   8/1992   Kasman ................... G01K 1/10
                                              374/E1.021
5,743,646 A *   4/1998   O'Connell ............... G01K 1/08
                                              374/208
(Continued)

FOREIGN PATENT DOCUMENTS

DE           20318550 U1     6/2004
DE     102006015427          11/2007
(Continued)

OTHER PUBLICATIONS

DIN EN60068-2-17, "Environmental Audits—Part 2: Tests—Test A: Leakage (IEC 68-2-17:1994)", Aug. 1994, with English translation, 26 pages.

(Continued)

*Primary Examiner* — Randy W Gibson
(74) *Attorney, Agent, or Firm* — Ruggiero McAllister & McMahon LLC (57) ABSTRACT

A unit for high-temperature for uses above 700° C. is provided. The unit includes a housing and an electrical functional element. The functional element has a non-conducting substrate, an electrically conductive element, and at least one connection wire or pad. The functional element has a first section, a second section, and a third section. The first section is within the housing and shielded from a local environment. The second section includes the at least one connection wire or pad and is accessible externally to the housing. The third section is between the first and second sections and is embedded in an electrically insulating material. The insulating material seals off the housing from the functional element. A physical and/or chemical bond at an interface between the insulating material and the functional element.

20 Claims, 6 Drawing Sheets

(51) Int. Cl.
*G01K 7/00* (2006.01)
*H01C 7/00* (2006.01)
*H05B 3/08* (2006.01)
*H05B 7/00* (2006.01)
*G01N 27/407* (2006.01)

(52) U.S. Cl.
CPC ......... *G01N 27/4078* (2013.01); *H01C 7/006* (2013.01); *H05B 2203/016* (2013.01)

(58) Field of Classification Search
CPC ......... H05B 2203/016; G01N 27/4078; G01F 1/68; G01F 1/69; G01F 1/692; G01F 1/688
See application file for complete search history.

(56) References Cited

U.S. PATENT DOCUMENTS

| | | | |
|---|---|---|---|
| 7,740,403 | B2 | 6/2010 | Irrgang |
| 9,958,336 | B2 * | 5/2018 | Ihle ................. G01K 7/223 |
| 10,309,839 | B2 * | 6/2019 | Yoshida ................. G01K 7/02 |
| 10,809,136 | B2 * | 10/2020 | Holoubek ............... G01K 7/183 |
| 11,454,551 | B2 * | 9/2022 | Sato ......................... G01K 1/10 |
| 11,566,946 | B2 * | 1/2023 | Umkehrer ............ G01K 15/005 |
| 2010/0117784 | A1 | 5/2010 | Holoubek |
| 2013/0128925 | A1 * | 5/2013 | Hoenicka ................. G01K 1/08 374/208 |
| 2013/0235904 | A1 | 9/2013 | Toudou |
| 2017/0138796 | A1 * | 5/2017 | Yoshida ................... G01K 1/08 |
| 2017/0205294 | A1 | 7/2017 | Yoshida |
| 2018/0073936 | A1 * | 3/2018 | Ozeki ...................... G01K 1/12 |
| 2019/0086274 | A1 | 3/2019 | Holoubek |
| 2019/0112225 | A1 | 4/2019 | Mix |
| 2019/0353528 | A1 | 11/2019 | Umkehrer |
| 2019/0360871 | A1 * | 11/2019 | Saecker ................. G01K 5/025 |
| 2020/0363271 | A1 | 11/2020 | Sato |
| 2021/0265083 | A1 * | 8/2021 | Mitra ........................ C03C 8/02 |
| 2022/0112118 | A1 * | 4/2022 | Mix ......................... C03C 3/097 |
| 2022/0113221 | A1 * | 4/2022 | Mix .......................... C03C 8/24 |

FOREIGN PATENT DOCUMENTS

| | | |
|---|---|---|
| DE | 102008002191 | 12/2009 |
| DE | 112015001343 | 12/2016 |
| DE | 102017100267 | 7/2018 |
| DE | 112019000625 T5 | 11/2020 |
| DE | 112015003303 B4 | 4/2022 |
| EP | 2801803 A1 | 12/2014 |
| EP | 2145166 | 7/2017 |
| EP | 3301420 | 4/2018 |
| EP | 3559620 | 10/2019 |
| EP | 3443311 | 9/2021 |
| JP | 2011232332 | 11/2011 |
| JP | 2015052572 | 3/2015 |
| WO | 2017220700 | 12/2017 |
| WO | 2018114336 | 6/2018 |
| WO | 2020094755 | 5/2020 |
| WO | 2020260099 | 12/2020 |

OTHER PUBLICATIONS

MIL-STD-883K, "Test Method Standard—Microcircuits", Apr. 25, 2016, 765 pages.

* cited by examiner

UNIT FOR HIGH-TEMPERATURE USES

CROSS REFERENCE TO RELATED APPLICATIONS

This application claims benefit under 35 USC § 119 of German Application DE 10 2021 116 345.5 filed on Jun. 24, 2021, the entire contents of which are incorporated herein by reference.

BACKGROUND

1. Field of the Invention

The invention relates to a unit for high-temperature uses, in particular for uses above 700° C., comprising a housing and at least one electrical functional element. The at least one electrical functional element can be designed in particular as a sensor element or as a heating element.

2. Description of Related Art

The unit is configured in particular for use in harsh environments in which may be present not only high temperatures above about 700° C., but also aggressive media such as hot gases containing corrosive and/or decomposing chemical substances and/or molecules. An example of such harsh environments is the offgas systems of power plants and combustion engines, for example in vehicles such as automobiles and in industrial plants.

In the prior art, units are known in which a sensor element, for example a temperature-sensor element, is accommodated in a housing that includes for example a protective tube. Such housings are often not hermetically sealed, especially at high temperatures, with the result that the sensor elements are impaired by for example corrosive gases. This leads in particular to drift in measured values determined by the sensor element.

EP 3 301 420 A1 discloses a temperature sensor arrangement with high resistance to aggressive gases, in which a measuring insert having a measuring element is accommodated in a protective tube in a manner that results in an intervening space through which a purge gas is able to flow. There is additionally provision for the arrangement of an absorption unit in said intervening space. The absorption unit at least partially encloses the measuring insert and absorbs contaminants present in the intervening space with a getter material.

A hermetically sealed temperature sensor arrangement is not described by EP 3 301 420 A1.

EP3559620 A1 describes a sensor device having a temperature-sensor element arranged in a sensor head. The interior of the sensor head is filled with two materials, a first material serving to fix a component of the temperature-sensor element in place inside the sensor head and the second material serving to conduct heat inside the sensor head. The first material may be a ceramic powder or a ceramic grouting.

The fixing material of the sensor device does not allow a hermetically sealed encapsulation of the temperature-sensor element.

DE 10 2006 015 427 B3 discloses a measuring probe for determining a physical value. The measuring probe includes a tube, at the end of which is arranged a measuring probe. The tube passes through a fastening sleeve and is held in place inside the fastening sleeve in an electrically insulated manner by means of a glass packing.

Customary glass materials are unsuitable for high temperatures above 700° C.

WO 2020/094755 A1 discloses a joining connection between two joining partners that includes an at least partially crystallized glass as an insulating component. The at least partially crystallized glass permits the formation of a stable microstructure that is mechanically stable even at high temperatures. The insulating component can additionally include a structure that extends a direct path along the surface of the insulating component between the two joining partners.

WO 2020/260099 A1 describes a sensor component having a bushing element for uses at temperatures above 700° C. The bushing element includes a through-opening, through which a connecting pin passes and is held in place by an insulating element.

In order to be able to ensure a sensor element has lasting functionality in use at high temperature, it needs to be protected from contaminating substances from the local environment that could impair the function of the sensor element, thereby leading to distortion and drift in a measured value provided by the sensor. For this, it is desirable that the sensor element or the active component thereof is accommodated, and hermetically sealed, inside a sensor unit.

SUMMARY

The object of the invention can thus be regarded as that of providing a unit for high-temperature uses that comprises a housing and at least one electrical functional element.

What is proposed is a unit for high-temperature uses, in particular for uses above 700° C., which includes a housing and at least one electrical functional element. The at least one electrical functional element includes a non-conducting substrate, an electrically conductive element, and at least one connection wire or connection pad. The design is such that the at least one electrical functional element is employed in the housing such that a first section of the electrical functional element is accommodated within the housing and is shielded from the local environment by the housing and that a second section of the electrical functional element that includes at least a portion of the at least one connection wire or of the connection pad is externally accessible. The design is additionally such that the at least one electrical functional element includes between the first section and the second section a third section that is embedded in an electrically insulating material of the housing, wherein the electrically insulating material seals off the housing from the electrical functional element, the electrically insulating material being selected from a glass, a glass ceramic, a combination of a plurality of said materials or from a composite material having as its principal constituent a glass or glass ceramic, and wherein the insulating material has been fused onto the at least one electrical functional element, resulting in the formation of a physical and/or chemical bond at an interface therebetween.

This intimate connection between the electrically insulating material and the at least one functional element renders superfluous any additional sealing elements. The at least one electrical functional element can be designed in particular as a sensor element or as a heating element.

The fusing of the insulting material onto the at least one electrical functional element creates a hermetically sealed bushing through which the second section of the electrical functional element is passed out of the housing and made externally accessible. Hermetically sealed is understood as meaning here a bushing having a helium leak rate of less than $1\cdot 10^{-5}$ mbar·l/sec and preferably within a range from $1\cdot 10^{-10}$ mbar·l/sec to $1\cdot 10^{-6}$ mbar·l/sec. The helium leak rate is preferably measured in accordance with DIN EN60068-2-17 or MIL-STD-883 method 1014.9 condition A4.

The first section of the at least one electrical functional element is located inside the housing of the unit. The hermetically sealed bushing of the at least one electrical functional element closes the housing with a hermetic seal, which means that the first section of the electrical functional element is protected from contamination by substances from outside the housing.

The at least one electrical functional element includes at least one electrically non-conducting substrate, an electrically conductive element, and at least one connection wire or at least one connection pad. Such connection wires or connection pads provide electrical contact with the electrical functional element. A connection pad may here be designed for example as a metallized surface that is configured to be contacted by an electrical conductor, for example a wire. For example, a wire may be connected to a connection pad by soldering or welding. The connection pad may in particular comprise a system made up of a plurality of different layers, wherein for example the uppermost layer may consist of gold.

The non-conducting substrate is preferably produced from a temperature-resistant and electrically non-conducting material, for example from a ceramic, a glass and/or a glass ceramic. Ceramics customarily used for ceramic substrates include alumina ($Al_2O_3$) and zirconia ($ZrO_2$).

The non-conducting substrate may be designed for example as a flat, preferably rectangular, substrate. A cylindrical design is however also possible, for example in the form of a circular cylinder.

The electrically conductive element is preferably arranged on the substrate or embedded therein. The electrically conductive element is preferably provided in the form of a thick layer, a thin layer or in the form of a wire made of an electrically conductive material. The material of the electrically conductive element is preferably a metal or a metal alloy or a material mixture that includes at least one metal or metal alloy.

Thin layers may be obtained for example by a coating process such as vapour deposition, chemical vapour deposition, electrodeposition or physical vapour deposition. A thin layer has for example a thickness ranging from a few nanometres to a few micrometres. A thin layer is customarily thinner than 1 μm. Thick layers may be obtained for example by applying a paste that comprises the electrically conductive material and a binder, followed by a thermal treatment. Thick layers are typically one to two orders of magnitude thicker than thin layers.

When the electrical functional element is designed as a sensor element, in particular a temperature-sensor element, the material used for the electrically conductive element is preferably platinum or a platinum alloy.

When the electrical functional element is designed as a heating element, preference is given to employing as the electrically conductive element a metal or metal alloy having a high melting point and high electrical resistance. In particular, a heat conductor alloy can be used as material, for example a nickel-chromium alloy containing for example 80% nickel and 20% chromium, for example an alloy of 55% copper, 44% nickel and 1% manganese obtainable under the name Constantan. Suitable examples when using metals are tungsten or platinum. It is however also possible to use semiconductors such as silicon carbide as the electrically conductive element. In the heating element, the electrically conductive element is preferably designed in the form of a wire or a thick layer.

When the electrically conductive element is configured in the form of a layer, this is preferably structured whereby one or more conductor tracks may be formed. The layer is here preferably structured such that a single conductor track is formed, this having a meandering path on the non-conducting substrate. When the electrically conductive element is provided in the form of a wire, this is preferably coiled, the wire being able to be at least partially coiled around the substrate. It is however also possible for the coiled wire to be embedded in the substrate.

The meandering portion of the conductor track or the coiled portion of the wire represents the active component of the electrical functional element when the electrical functional element is designed as a sensor element or as a heating element. This active component is preferably located entirely in the first section of the electrical functional element, it being possible for small portions of a conductor track leading to a junction to extend into the adjoining third section. When a connection pad is provided, portions of the conductor track may extend through the adjoining third section to the connection pad in the second section, thereby connecting the connection pad with the meandering portion of the conductor track.

A junction at which a conductor track is contacted by a connection wire is located preferably in the third section of the electrical functional element. This ensures that this junction is embedded in the electrically insulating material of the housing.

The non-conducting substrate forms the base for the electrically conductive element and its design depends on the particular embodiment of the electrically conductive element. Accordingly, flat substrates are preferably employed when combined with electrically conductive elements designed as a thick layer or thin layer and cylindrical substrates are preferably employed with electrically conductive elements designed in the form of a wire.

In the case of the electrically conductive element designed in the form of a layer, the at least one connection wire is connected as an additional element to this layer at a contact point, for example by soldering or welding. When the electrically conductive element is designed as a wire, the at least one connection wire may be configured as an extension of the electrically conductive element, wherein a portion of the electrically conductive element projecting beyond the non-conducting substrate then serves as the connection wire.

When an additional connection wire is used, a temperature-resistant metal or a temperature-resistant alloy is preferably chosen as material. Suitable materials for the connection wire include in particular nickel, platinum or nickel/platinum alloys. The connection wire may also be coated, for example a platinum-plated nickel wire may be used.

It is preferable that at least the electrically conductive element and/or an electrical contact point between the at least one connection wire and the electrically conductive element of the at least one functional element are covered with a covering material, the covering material preferably being different from the electrically insulating material.

The covering material may in particular be in the form of a layer or of a layer system. The covering material may in particular include a protective layer and/or a passivation layer. Particularly in the case of the electrically conductive element designed in the form of a thick layer or thin layer, it is preferable for there to be at least one passivation layer that insulates the electrically conductive element, in particular an electrically conducting layer, and protects it from changes caused by substances from the local environment. It is also possible for there to be multiple layers made of different materials. Particularly suitable materials for a passivation layer are glass or ceramic. The protective layer and/or a passivation layer may additionally or alternatively also cover a contact point at which a connection wire is connected to the electrically conducting layer.

When the electrical functional element is designed as a temperature-sensor element, this is in particular configured as a standardized temperature-measuring resistor, more particularly as a Pt100, Pt200, Pt500, Pt1000 or Pt10000 temperature-measuring resistor. A temperature-measuring resistor is here an electrical functional element, the electrical resistance of which changes in a characteristic manner with the temperature.

It is possible to integrate a plurality of functions in an electrical functional element. For example, a flat ceramic substrate may have on a first side a thin layer of platinum that serves as a temperature sensor and on a second side that is the obverse of the first side the ceramic substrate may have a thick layer that serves as a heating element.

It is likewise conceivable that an electrical functional element comprises a plurality of substrates each having one or more electrically conductive elements and thus together combining a plurality of functions in a single electrical functional element.

The electrically insulating material is preferably selected from a glass or a glass ceramic or a combination of a plurality of such materials. Alternatively, the electrically insulating material may also be a composite material having as its principal constituent a glass or glass ceramic, wherein the composite material may additionally comprise an aggregate such as a ceramic powder. The composite material here consists preferably to an extent of over 70% by weight, preferably over 80% by weight, more preferably over 90% by weight, of glass and/or a glass ceramic.

To permit use in the high-temperature range, the electrically insulating material is in particular selected such that the melting temperature, or the glass transition temperature in the case of a glass, is above preferably 700° C. The electrically insulating material is here configured such that it is fused to the at least one electrical functional element, thereby achieving an intimate connection. These connections are also referred to as joint connections or joining connections.

The electrically insulating material may in particular be a sealing glass. Sealing glasses are used to achieve tight connections between components to be joined.

The electrically insulating material is preferably designed as a shaped body that serves as the housing of the unit or as a portion of the housing of the unit.

The electrically insulating material may in particular be a glass ceramic or a partially crystallized glass. Glass ceramics and at least partially crystallized glasses can be obtained by crystallization, preferably a controllable crystallization, more preferably a controlled crystallization, wherein a structure is obtained in which it is possible to achieve a narrow distribution of the dimensions in space of the crystals or crystallites that can be assigned to the same crystal phase and/or wherein it is possible to achieve a favoured arrangement of the crystals or crystallites.

Crystallization affords from a crystallizable glass an at least partially crystallized glass, i.e. a glass having a crystal phase content of more than 0.1% based on volume. Such an at least partially crystallized glass that comprises at least one crystal phase and also a glassy phase, for example an at least partially crystallizable glass or a residual glassy phase, is referred to in the context of the present invention also as a glass ceramic. It is also possible that the glass ceramic is present in a completely crystallized form in the sense that the crystallized phase comprises over 99% by volume, for example up to 99.9% by volume. The proportion of the residual glassy phase is preferably still high enough to ensure good wetting of a joining partner, for example of the at least one electrical functional element in particular. It is advantageous therefor when the proportion of residual glassy phase in the at least partially crystallized glass is at least 5% by volume, preferably at least 10% by volume.

High levels of crystallization in the electrically insulating material are advantageous in order to avoid reactions with materials of the electrical functional element, ion migration at high temperatures being avoided in particular.

A partially crystallized glass of this kind is disclosed for example in WO 2020/094755 A1. The partially crystallized glass described therein is suitable for joining connections that are stable at high temperatures and is also advantageously employable for joining connections that are subject to mechanical stress.

The preferably at least partially crystallized glass comprises in addition to $SiO_2$
- $La_2O_3$ greater than 0.3 mol % to less than 5 mol %, preferably less than or equal to 4.5 mol %, more preferably less than or equal to 4 mol %,
- $Nb_2O_5$ 0 mol % to 9 mol %,
- $Ta_2O_5$ 0 mol % to 7 mol %,
- Where $\Sigma(A_2O_5)$ greater than 0.2 mol % to 9 mol %,
- where A is an element that in oxides is normally in the oxidation state V+ and comprises or may comprise for example Nb and/or Ta or P and/or mixtures thereof.

It has been shown that a firm joining connection, for example a joining connection that is stable at high temperatures and/or highly resistant to mechanical stress, can be achieved through addition of an adequate amount, i.e., an amount within the limits defined above, of the oxides $La_2O_3$, $Ta_2O_5$ and/or $Nb_2O_5$ and optionally of further oxides of the composition $A_2O_5$.

A here denotes an element that in oxides is normally in the oxidation state V+. Thus, it is possible that not all atoms "A" present in the crystallizable or at least partially crystallized glass are in the same oxidation state.

The oxides $La_2O_3$, $Nb_2O_5$ and $Ta_2O_5$ and optional further oxides $A_2O_5$ present in the glass are also referred to in the context of the present disclosure as "glass-matrix-forming oxides", where this term is in the context of the present disclosure to be understood as meaning that such oxides remain initially in the glass matrix after thermal treatment of the crystallizable glass, i.e. when the glass is present in the form of an at least partially crystallized glass. The term "glass-matrix-forming oxides" differs herewith from the more general term "glass-forming oxides". More particularly, the oxides MgO and CaO are in the context of the present disclosure not glass-matrix-forming oxides, even though CaO is for example a standard constituent of conventional glasses, for example of soda-lime glasses. In the glasses according to the embodiments of the present disclosure, although oxides such as CaO and MgO are incorporated into the crystal phases, they do not remain in the glass matrix and are therefore also not glass-matrix-forming oxides.

It is however perfectly possible that at least a portion of the glass-matrix-forming oxides, for example $La_2O_3$, may be incorporated at least partially into crystal phases in the further course of ceramization. However, a residual, albeit small, content of glassy phase normally remains, which is formed in particular by the glass-matrix-forming oxides.

The formation of the joining connection in accordance with the present disclosure using the oxides $La_2O_3$ and also $Nb_2O_5$ and/or $Ta_2O_5$ and also optionally further oxides $A_2O_5$ within the limits defined above is advantageous, since the at least partially crystallized glass is thereby particularly advantageously configured in that fusion then takes place during thermal treatment to create the connection. This is thus a particularly advantageous way of creating a firm connection between the individual parts of the joining connection, in particular a firm connection of the at least partially crystallized glass to the joining partner. Limiting the glass-matrix-forming oxides to within the limits defined above does however advantageously ensure that the joint connection at the same time has high thermal stability and/or high mechanical strength.

In the context of the present disclosure, the following definitions apply:

In the context of the present disclosure, a crystallizable glass is understood as meaning a glass that is amenable to crystallization, in particular to a controlled or at least controllable crystallization. Controlled crystallization is here understood as meaning that it is possible, by means of a selective thermal treatment, to convert the crystallizable glass into a state in which the glass is present in an at least partially crystallized form and wherein the crystallographic composition of the at least partially crystallized glass and/or the microstructure thereof, i.e. the arrangement in space and/or size of the crystals and/or crystallites present in the at least partially crystallized glass, is preferably selectively set. It is preferably possible by means of a controlled crystallization to obtain for example a microstructure in which the crystallites are of essentially uniform size, for example in the single-digit micrometre range, i.e., all crystallites have for example an equivalent diameter of about 1 μm to 3 μm.

Other microstructures containing larger or smaller crystallites are of course also possible.

When the at least partially crystallized glass has more than one different crystal phase, it is also possible for the average crystal or crystallite size to be relatively similar within one crystal phase but for there potentially to be pronounced differences in crystallite size between the individual crystal phases.

The opposite situation to preferably controlled or controllable crystallization can be regarded as spontaneous crystallization of a glass, in which unexpected crystal phases, often also undesired crystal phases, can occur and complete devitrification can in particular also occur.

In the context of the present disclosure, a crystal aggregate or crystal association is understood as meaning an intergrowth of at least two crystals or crystallites. The crystals or crystallites may in particular have grown together here in an irregular manner. This means that the individual crystals or crystallites of an aggregate have not necessarily grown together along a favoured direction or along a particular crystal plane.

When a crystal or crystallite has a needle-like form, this is understood as meaning that the crystal or crystallite has a direction in which its dimension is at least an order of magnitude greater than its dimensions in the other two directions in space. In other words, a crystal or crystallite having a needle-like form may have formed in an acicular or rod-like manner or in the form of a prism, the lateral dimensions of the prismatic basic form being at least an order of magnitude smaller than the length of the crystal or crystallite. Such crystals or crystallites are also described as being prismatic in form.

The crystallites may also have formed in a plate-like manner, i.e. in the form of small plates interspersed in the crystalline glass. In cross section such a form likewise has the appearance of a rod, which makes them difficult to differentiate in the individual case. Plates are in the context of the present disclosure understood as meaning a geometric form in which the lateral dimension in one direction in space of a Cartesian coordinate system (the thickness) has formed an order of magnitude smaller than the lateral dimensions (length, width) in the other two directions perpendicular to the first direction.

A radiating arrangement of crystals or crystallites is in the context of the present disclosure understood as meaning that crystals that have formed in a needle-like or plate-like manner, for example acicular or prismatic crystals or crystallites, are arranged about a centre such that one end points towards said point and the other end in each case points radially outwards in different directions in space. For example, the ends that point towards the centre may touch the central point. This is however not essential. Such a formation of crystal aggregates pointing radially outwards from a centre is present for example when a crystal aggregate has formed spherulitically. In such a spherulitic formation, the crystal aggregate is almost spherical or ellipsoidal in shape and may be almost circular when viewed in two dimensions. In practice, however, the intergrowth of crystals and crystal aggregates in a microstructure often results in a deviation from the ideal spherical or circular form of a spherulite. In particular, the crystals or crystallites forming the spherulite may have varying lengths and/or thicknesses.

Another embodiment of a radiating arrangement is a fan-shaped formation in two-dimensional section. For example, it is possible that formation of crystals or crystallites in a particular direction in space is not possible in the microstructure. Here too, the crystallites or crystals extend outwards from a centre, but only within a certain angle in space.

A rod-like or plate-like interspersed arrangement is understood as meaning that the individual crystals or crystallites do not extend outwards from a common centre in different directions in space, but are arranged in an irregular manner, for example without a pronounced favoured direction. In particular, the crystallites or crystals may be arranged in an interlocked manner. A structure of this kind can also be compared for example with the construction of a house of cards, in which the individual plates (like the cards in a house of cards) are arranged against one another and form a stable structure.

In the context of the present disclosure, a crystallization nucleus is understood as meaning a starting point for a crystallization. The crystallization nucleus favours the accretion of atoms to construct a crystalline lattice, for example thermodynamically or kinetically. More particularly, a crystallization nucleus may be a lattice defect and/or an arrangement of atoms. Interfaces can often be starting points for crystallization or they can include such starting points for a crystallization.

In one embodiment of the joining connection, at least some of the crystallites contain crystallization nuclei at the grain boundaries and/or enrichments comprising lanthanum, more particularly comprising lanthanum compounds, are arranged at the grain boundaries of the crystallites in at least some cases.

Such a configuration of a joining connection is advantageous in order to enable the formation of a particularly firm connection between at least partially crystallized glass and the joining partner. When at least some of the crystallites contain crystallization nuclei at the grain boundaries, this promotes the formation of the microstructure in the at least partially crystallized glass comprising crystal aggregates having for example a radiating arrangement or an arrangement of rod-like or plate-like crystals interspersed for example in the manner of a house of cards.

This is likewise the case when enrichments comprising lanthanum, more particularly comprising lanthanum compounds, are arranged at the grain boundaries of the crystallites in at least some cases. The inventors presume that enrichments of lanthanum, for example of lanthanum compounds, are able to act as effective crystallization nuclei.

A further preferred glass ceramic contains in mol % based on the oxide:
$SiO_2$ 25-55, preferably 35-50,
$B_2O_3$ 0.1-15, preferably 5-15,
$Al_2O_3$ 0-15, preferably 0-5, more preferably 0-<2,
MO 20-50, preferably 30-50,
where MO is selected from the group consisting of, individually or in any desired combination, MgO and/or CaO and/or SrO and/or BaO,
where SrO and/or BaO>0 and MgO<12, and
$M_2O$ 0-<2, preferably 0-<1,
where $M_2O$ is selected from the group consisting of, individually or in any desired combination, $Li_2O$ and/or $Na_2O$ and/or $K_2O$.

This glass ceramic is described for example in DE 10 2014 218 983 A1 in association with a bushing element and has the characteristic feature inter alia of a specific volume resistance of more than $1.0 \cdot 10^{10}$ Ωcm.

Another preferred glass ceramic/another at least partially crystallized glass contains the following oxides, specified in % by weight:
$SiO_2$: 20 to 60, preferably 25 to 50
$Al_2O_3$: 0.5 to 20, preferably 0.5 to 10
CaO: 10 to 50
MgO: 0.5 to 50, preferably 0.5 to 10
$Y_2O_3$: 0.1 to 20, preferably 3 to 20
$ZrO_2$: 0.1 to 25, preferably 3 to 20
$B_2O_3$: 1 to 15, preferably 3 to 12,
wherein $HfO_2$ may optionally additionally be present up to a content of 0.25% by weight.

Another suitable at least partially crystallized glass or glass ceramic contains the following oxides, specified in % by weight:
$SiO_2$: 36 to 54, preferably 40 to 54
$Al_2O_3$: 8 to 16, preferably 8 to 13
CaO: 0 to 35, preferably 5 to 25
MgO: 0 to 17, preferably 3 to 14
RO: 8 to 39, preferably 8 to 35
$ZrO_2$: 0 to 25, preferably 0 to 17
$B_2O_3$: 0 to 3, preferably 0 to 2, more preferably 0
where the proportion RO refers to the oxides BaO, SrO, MgO, ZnO, in each case individually or in any desired mixtures, and
preferably RO is, individually or in any desired mixtures, in % by weight:
BaO 0-36
MgO 0-22
CaO 0.

An at least partially crystallized glass of this kind is disclosed for example in WO 2017/220700 A1.

The at least partially crystallized glass is by means of a melting process initially obtained in a glassy form as a crystallizable glass and undergoes an at least partial crystallization only in a subsequent thermal treatment.

The hermetically sealed connection between the electrically insulating material and the at least one electrical functional element is achieved by fusing the electrically insulating material onto the electrical functional element. For this, it is possible for example to provide a green body comprising the electrically insulating material or a precursor thereof, for example a crystallizable glass. The green body is then together with the at least one electrical functional element subjected to a thermal treatment, as a result of which the electrically insulating material is fused onto the electrical functional element, forming a physical and/or chemical bond that provides a hermetic seal. In the case of a crystallizable glass as precursor, the crystallizable glass crystallizes at least partially during this process.

The crystallization can here be controlled in the sense that a selective thermal treatment, for example to form a precursor phase for the at least one crystal phase, is carried out, for example a so-called nucleation. However, it is also possible for crystallization to take place in an uncontrolled manner in the form that it occurs during another process step, for example in the course of a thermal treatment in which a connection providing a hermetic seal is created between a material, for example the material of an encasement, and the at least partially crystallized glass, without further process steps for selective crystallization having taken place.

The housing of the unit may include a cap made of a temperature-resistant material that at least partially surrounds the electrically insulating material. This cap may in particular be cup-shaped in design, with the open side of the cup shape pointing towards the second section of the at least one electrical functional element. It is likewise preferable that the protective cap is shaped and arranged such that the first section of the at least one electrical functional element is located within the protective cap.

The housing of the unit may include a protective tube made of a temperature-resistant material, which surrounds at least a portion of the second section of the electrical functional element. This is able to protect in particular the connection wires of the at least one electrical functional element. When the housing also includes a cap, the protective tube is preferably connected to the cap of the housing. The connection may be effected for example by laser welding or by soldering.

The temperature-resistant material of the protective tube and/or the temperature-resistant material of the cap is preferably selected from a temperature-resistant steel or alloy or a temperature-resistant ceramic and is in particular selected from alloy 600, steel 1.4762 or $Al_2O_3$ ceramic. When the housing includes both a cap and a protective tube, these may be made from the same material or from different materials, depending on the embodiment variant.

The housing of the unit is preferably designed and configured such that at least the first section of the at least one electrical functional element is shielded from metal parts of the housing. This may be achieved by embedding the first section in its entirety in the electrically insulating material, covering the first section with another non-metallic material, or by forming a cavity that accommodates the first section and has non-metallic walls.

Preferably, the housing of the unit includes a protective element made of a glass, a glass ceramic, a ceramic or a combination of a plurality of said materials. The materials described in connection with the electrically insulating material of the housing are in principle also suitable as material for the protective element.

This protective element may for example be connected to the electrically insulating material or to a shaped body made of the electrically insulating material.

Preferably, the first section of the electrical functional element is accommodated in a cavity within the housing, this cavity preferably being evacuated or filled with an inert gas, for example nitrogen or argon.

The first section of the at least one electrical functional element is then advantageously not in direct contact with any material of the housing that could potentially interact with the electrical functional element and thereby give rise for example to distortion in a measured value. In particular, ageing caused by corrosion or by migration is prevented or at least substantially reduced. This in turn reduces the drift over time in measured values obtained from the electrical functional element.

The walls of the cavity are here preferably made of the electrically insulating material of the housing. When the housing includes a protective element, this protective element may form one of the walls of the cavity.

The first section of the at least one electrical functional element is preferably embedded in its entirety in the electrically insulating material of the housing. In particular, the first two sections are thereby surrounded by the electrically insulating material of the housing in a seam-free manner.

Particularly where the housing includes a protective cap, this ensures that the electrical functional element is also shielded from being affected by the material of the protective cap.

The unit may additionally include at least one retaining element, which may be configured in particular to support the at least one connection wire. The retaining element may here be designed for example in the form of a tube, through which the at least one connection wire passes.

The at least one retaining element may be made of the same material as the electrically insulating material and be designed as a single unit therewith. The retaining element may however also be designed as a separate unit and be connected to the electrically insulating material. As an alternative thereto, the at least one retaining element may consist of a different material selected from a glass, a glass ceramic or a ceramic. In this case, the at least one retaining element is preferably partially embedded in the electrically insulating material and held in place by this.

The coefficient of thermal expansion of the electrically insulating material is preferably matched to a coefficient of thermal expansion of the at least one electrical functional element. The difference between the coefficients of thermal expansion is here preferably less than $5 \cdot 10^{-6}/K$, particularly preferably less than $3 \cdot 10^{-6}/K$ and very particularly preferably less than $1 \cdot 10^{-6}/K$.

When the electrical functional element has a zirconia ceramic substrate with a platinum layer, it is accordingly preferable when the coefficient of thermal expansion of the electrically insulating material is matched to the coefficient of thermal expansion of platinum, i.e. approx. $8.8 \cdot 10^{-6}/K$, and to that of zirconia, i.e. approx. $10.2 \cdot 10^{-6}/K$. It is accordingly preferable that the electrically insulating material has a coefficient of thermal expansion within a range from $8.8 \cdot 10^{-6}/K$ to $10.2 \cdot 10^{-6}/K$.

The coefficient of thermal expansion of the electrically insulating material is more particularly adjusted by an appropriate choice of material, i.e. of the glass or glass ceramic used. The selected material or else a mixture of more than one such material may be modified by aggregates. For example, the coefficient of thermal expansion of the electrically insulating material may be adjusted by a selective addition of a ceramic powder such as MgO as an aggregate.

In the case of a functional element having a platinum layer, the coefficient of thermal expansion of the electrically insulating material is preferably matched to the coefficient of thermal expansion of platinum. As an alternative thereto, the coefficient of thermal expansion may be matched to the average of the coefficients of expansion of the electrically conducting element and of the substrate of the electrical functional element. This is especially preferable when using a substrate based on alumina.

It is preferable when an electrical functional element of the unit is designed as a temperature-sensor element, wherein the temperature-sensor element preferably includes a ceramic substrate and a structured resistance layer arranged thereon, wherein the temperature-sensor element is more preferably designed as a Pt100, Pt200, Pt500, Pt1000 or Pt10000 temperature sensor. It is accordingly preferable that the electrical functional element is a standardized temperature-measuring resistor in a temperature-resistant structure. This temperature-measuring resistor is held in place in the housing of the unit by means of the electrically insulating material in such a manner that the active portion of the temperature-measuring resistor is accommodated in its entirety in the housing. The electrically insulating material here hermetically seals the housing from the portion of the temperature-measuring resistor that protrudes from the housing and includes the connection wires, thereby protecting the active portion of the temperature-measuring resistor from influences from the local environment. A temperature- and corrosion-resistant temperature-measuring unit is thus obtained.

An electrical functional element of the unit is preferably designed as a heating element. A temperature- and corrosion-resistant heating unit is thereby obtained.

A temperature-measuring unit and a heating unit may be employed together, for example to measure a flow of a fluid such as a gas or a liquid. For example, the temperature-measuring unit determines the current temperature, the heating unit being controlled so as to aim for a constant temperature. From the energy needed by the heating unit to maintain the temperature, it is then possible to deduce how much fluid is flowing past the two units.

A thermal flow measurement of this kind can also be executed by means of an integrated flow measuring unit. It is accordingly preferable that a unit designed as a thermal flow meter includes at least two electrical functional elements, with the unit including at least one electrical functional element designed as a temperature-sensor element and at least one designed as a heating element. It is of course also possible to integrate both functions in one electrical functional element. In this case, the unit designed as a thermal flow meter accordingly includes an electrical functional element designed as a combined temperature-sensor element and heating element.

The proposed units may be used in particular in areas in which high temperatures and adverse conditions such as corrosive media are present. The proposed units are moreover also mechanically extremely robust, which means they can also be used in areas with high mechanical stresses such as strong vibrations. Preferred possible uses for the proposed units include for example uses as sensors in the transport sector, especially in the automotive sector, the power plant sector and industry, especially the chemical industry.

A particularly preferred use of the proposed units relates to measurements in exhaust gases, especially exhaust gases from power stations, internal combustion engines, power units or industrial plants. The good temperature resistance, the resistance to corrosive media and the high mechanical stability of the units are particularly advantageous here.

It is understood that the features mentioned above and those hereinbelow yet to be elucidated can be used not just in the combination indicated in each case, but also in other combinations or on their own, without departure from the scope of the present invention.

Preferred configurations and embodiments of the invention are shown in the drawings and will be elucidated in more detail in the description hereinbelow, where identical reference signs refer to identical or similar or functionally identical components or elements.

DETAILED DESCRIPTION

Figure 1:
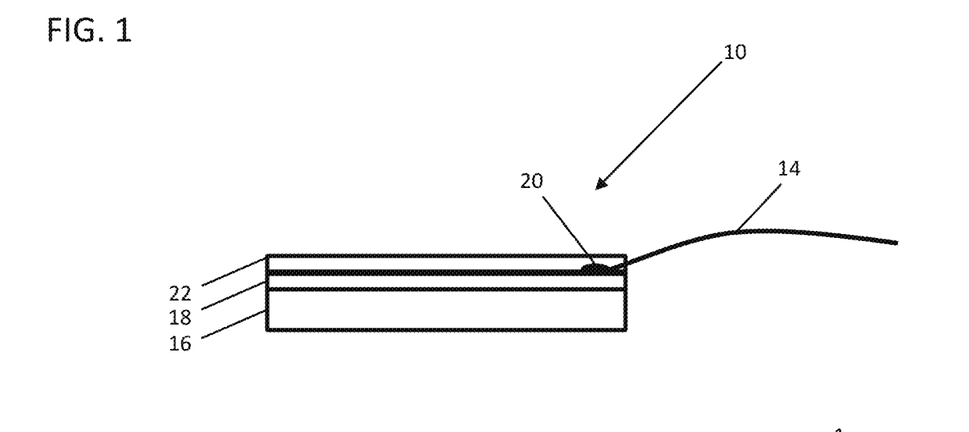
FIG. 1 shows a schematic section view of an electrical functional element designed as a temperature-sensor element.

FIG. 1 shows in schematic form an electrical functional element 10 designed as a temperature-sensor element in a section view from the side. The electrical functional element 10 includes a non-conducting substrate 16. Arranged on one surface of the non-conducting substrate 16 is an electrically conductive element 18 in the form of a thin layer. This is in the example of the temperature-sensor element structured such that a conductor track following a meandering path on the surface of the non-conducting substrate 16 is formed. This conductor track is here a temperature-measuring resistor, the electrical resistance of which changes in a characteristic manner with the temperature.

The electrically conductive element 18 and the conductor track formed by structuring is in electrical contact with contact points 20 via connection wires 14. In the case of a temperature-sensor element, two or four connection wires 14 are for example used to permit a two-point or four-point measurement of the electrical resistance, only one being visible in the section view in FIG. 1.

The electrically conductive layer 18 and the contact point 20 are in the example shown in FIG. 1 provided with a covering material 22, to provide protection from environmental influences. Instead of a single layer, as outlined in FIG. 1, the covering material 22 may also be formed as a layer system having a plurality of different layers.

Figure 2:
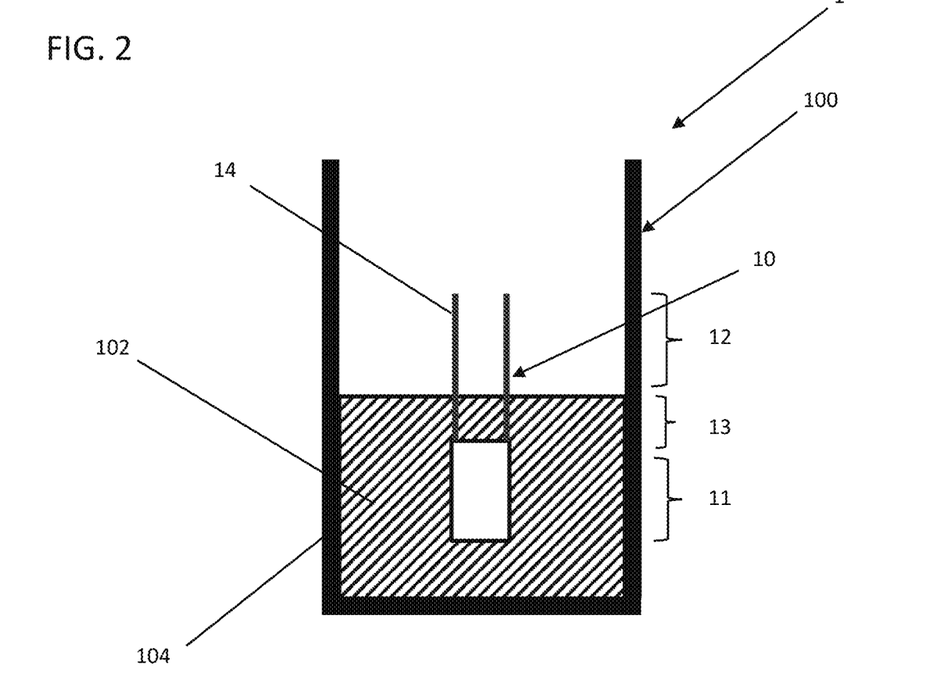
FIG. 2 shows a first embodiment of a unit having an electrical functional element for high-temperature uses.

FIG. 2 shows a first embodiment of a unit 1 for high-temperature uses, which includes an electrical functional element 10 and a housing 100. The unit 1 is here shown in a section view from the front. The housing 100 includes in this exemplary embodiment a cap 104 that is for example produced from a temperature-resistant metal alloy. The housing 100 includes in addition to the cap 104 an electrically insulating material 102 that closes the open side of the cap 104. The electrically insulating material 102 is for example a partially crystallized glass or a glass ceramic.

A first section 11 of the electrical functional element 10 is embedded in its entirety in the electrically insulating material 102. In the case of a temperature-sensor element as shown in FIG. 1, this first section includes the meandering conductor track and thus the active portion of the temperature-sensor element.

A second section 12 of the electrical functional element 10 that includes portions of the connection wires 14 is here not enclosed by the electrically insulating material 102 and is externally accessible for electrical contacting. In an alternative embodiment variant, the electrical functional element 10 also includes connection pads instead of connection wires 14. These would then be arranged on the non-conducting substrate 16 similarly to the contact point 20 shown in FIG. 1, such that the second section then accordingly includes a portion of the substrate 16. An exemplary embodiment in which the second section 11 includes a portion of the non-conducting substrate 16 is also described below with reference to FIG. 5.

A third section 13 of the electrical functional element 10 that is situated between the first section 11 and the second section 12, and that includes the contact points 20 shown in FIG. 1, is in the embodiment shown in FIG. 2 likewise embedded in the electrically insulating material 102, such that only a portion of the connection wires 14 protrudes from the electrically insulating material 102.

The electrically insulating material 102 is fused onto the connection wires 14 such that a hermetically sealed connection is present. The electrically insulating material 102 is likewise fused onto the cap 104 such that a hermetically sealed connection is present here too. As a result of this intimate connection between the electrically insulating material 102 and the at least one functional element 10 and between the electrically insulating material 102 and the cap 104, additional sealing elements are superfluous, which means that the proposed unit 1 is free of additional sealing elements.

The first section 11 containing the active portion of the electrical functional element 10 is advantageously encased in its entirety in the insulating material 102, which means it is unable to interact either with the local environment or with other constituents of unit 1 such as the cap 104. Therefore, contamination of the electrical functional element 10 with constituents of the cap 104 is for example excluded.

Figure 3:
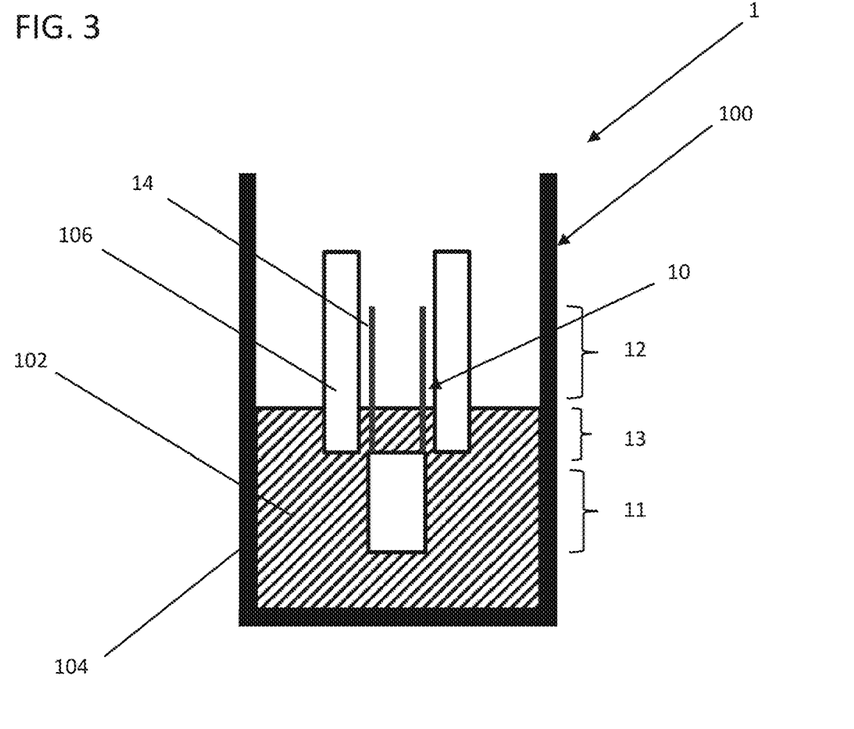
FIG. 3 shows a second embodiment of a unit which additionally includes a retaining element.

FIG. 3 shows a second embodiment of a unit 1. This corresponds essentially to the first embodiment described with reference to FIG. 2, except that it additionally includes a retaining element 106.

The retaining element 106 is here tubular in form and is held in place by the electrically insulating material 102. To this end, a portion of the retaining element 106 is embedded in the electrically insulating material 102. The retaining element 106 is arranged such that it surrounds the connection wires 14 and thereby mechanically supports them. The retaining element 106 may for example consist of a ceramic.

Figure 4:
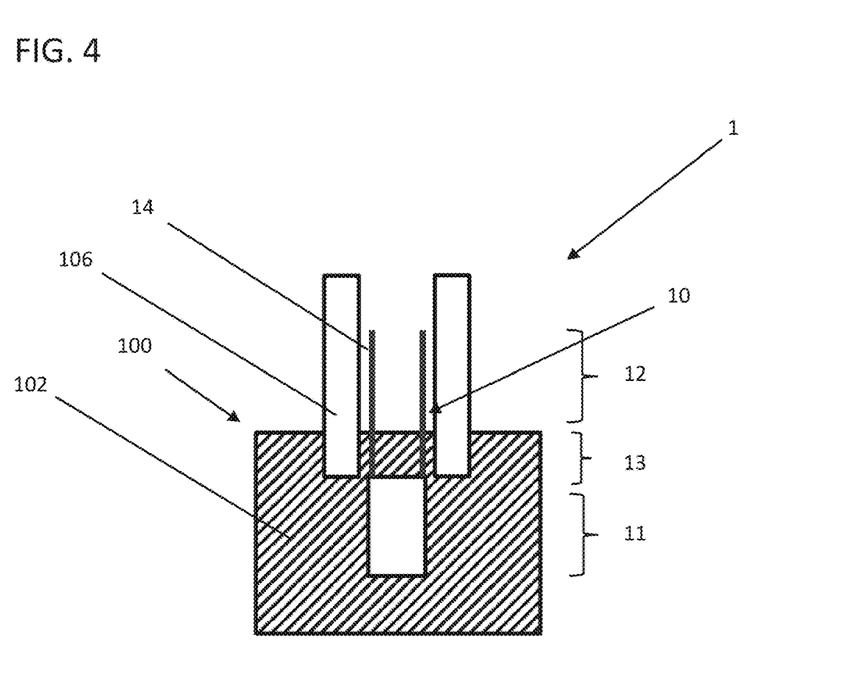
FIG. 4 shows a third embodiment of a unit.

FIG. 4 shows a third embodiment of a unit 1. This corresponds essentially to the second embodiment described with reference to FIG. 3, except that it does not include a cap 104. The housing 100 here consists exclusively of a shaped body made of the electrically insulating material 102.

Figure 5:
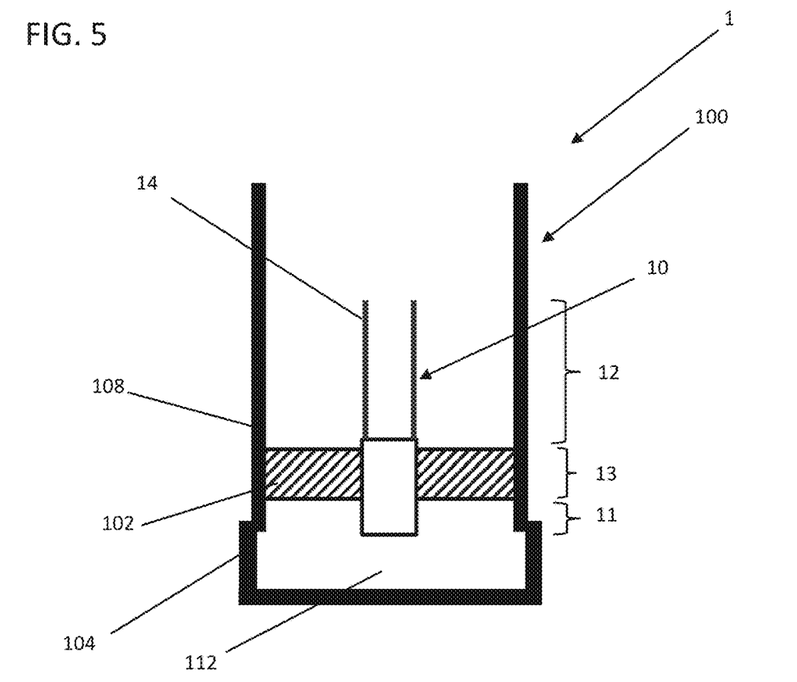
FIG. 5 shows a fourth embodiment of a unit.

FIG. 5 shows a fourth embodiment of a unit 1. The housing 100 includes in this exemplary embodiment a cap 104, at the open end of which a protective tube 108 is connected. The cap 104 and the protective tube 108 consist for example in both cases of temperature-resistant metal alloys and are connected together for example by welding.

The electrical functional element 10 is inserted in the protective tube 108 as far as the region of the protective cap 104 and is held in place and sealed off from the protective tube 108 by means of a plug of the electrically insulating material 102, with the result that a closed cavity 112 is present in the region of the cap 104 and at the end of the protective tube 108. A first section 11 of the electrical functional element 10 is located in the cavity 112 and a second section 12 of the electrical functional element 10, which here includes the connection wires 14 in their entirety, is located outside the cavity and is not covered by the electrically insulating material 102, which means that the connection wires 14 are accessible from outside the housing 100. Instead of connection wires 14, the electrical functional element 10 could also have connection pads arranged in the second section 12.

A third section 13 situated between the first section 11 and the second section 12 is held in place by the electrically insulating material 102, wherein the electrically insulating material is in this third section connected to the electrical functional element 10 with the formation of a hermetic seal. More particularly, the electrically insulating material 102 is here fused onto the non-conducting substrate 16 and the covering material 22, cf. FIG. 1. The electrically insulating material 102 is likewise connected to the protective tube 108 with the formation of a hermetic seal, with the result that the cavity 112 is closed with a hermetic seal.

Figure 6:
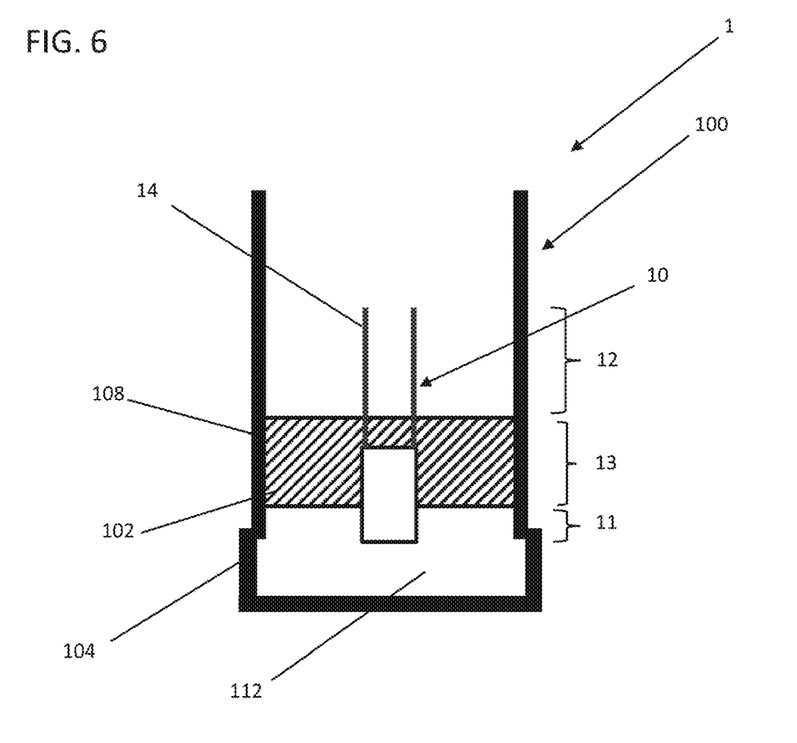
FIG. 6 shows a fifth embodiment of a unit.

FIG. 6 shows a fifth embodiment of the unit 1, which corresponds essentially to the fourth embodiment described with reference to FIG. 5. However, in this case the third region 13 of the electrical functional element 10 that is connected to the electrically insulating material 102 additionally encases a portion of the connection wires 14, which means more particularly that contact points 20 between the electrically conductive element 18, cf. FIG. 1, and the connection wires are situated within the region surrounded by the electrically insulating material 102. This provides the contact points 20 with particularly good protection.

Figure 7:
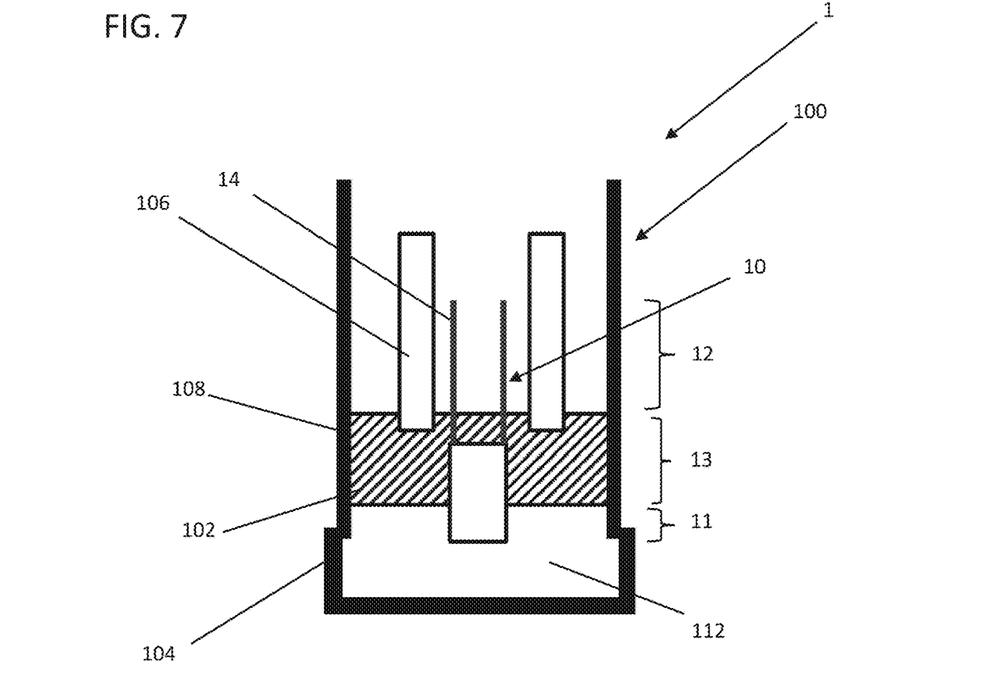
FIG. 7 shows a sixth embodiment of a unit.

FIG. 7 shows an sixth embodiment of a unit 1. This corresponds essentially to the fifth embodiment described with reference to FIG. 6, except that it additionally includes a retaining element 106.

The retaining element 106 is here tubular in form and is held in place by the electrically insulating material 102. To this end, a portion of the retaining element 106 is embedded in the electrically insulating material 102. The retaining element 106 is arranged such that it surrounds the connection wires 14 and thereby mechanically supports them. The retaining element 106 may for example consist of a ceramic.

Figure 8:
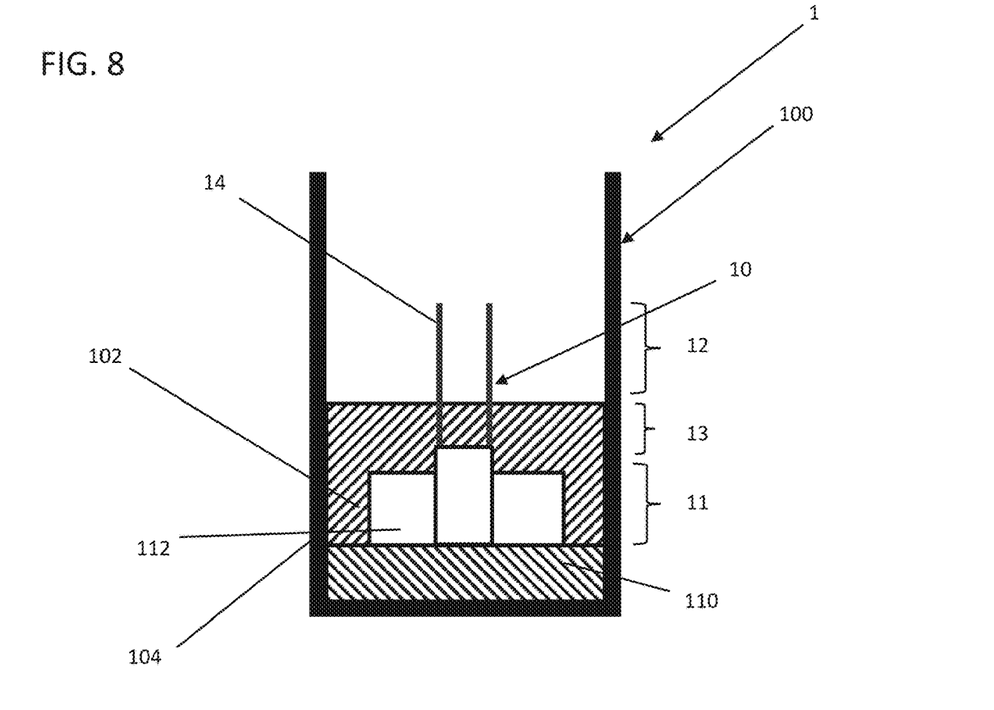
FIG. 8 shows a seventh embodiment of a unit.

FIG. 8 shows a seventh embodiment of a unit 1. This corresponds essentially to the fifth embodiment described with reference to FIG. 6, except that the walls of the cap 104 facing the interior of the cavity 112 are lined with a non-metallic material.

The wall at the closed end of the cap 104 is in this example lined with a protective element 110. The material of the protective element 110 is for example a glass, a ceramic or a glass ceramic. The lateral walls of the cavity 112 are lined with the electrically insulating material 102, these side walls in the exemplary embodiment shown in FIG. 8 being designed as a single unit with the plug-shaped piece of the electrically insulating material 112 which holds in place the third section 13 of the electrical functional element 10.

In addition, the first section 11 of the electrical functional element 10 is in the seventh embodiment chosen such that, when the electrical functional element 10 is designed as a temperature-measuring resistor, this contains the conductor track constituting the measuring resistor in its entirety. Thus, the active portion of the electrical functional element 10 is in this embodiment located entirely within the cavity 112.

Figure 9:
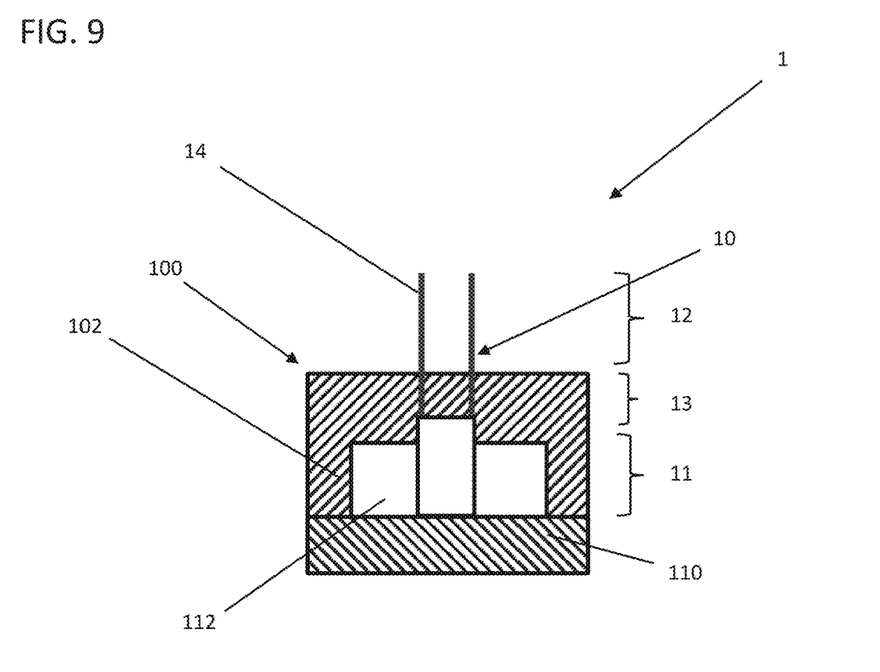
FIG. 9 shows an eighth embodiment of a unit.

FIG. 9 shows an eighth embodiment of a unit 1. This corresponds essentially to the seventh embodiment described with reference to FIG. 8, except that the eighth embodiment does not include a cap 104. The housing 100 thus consists of the electrically insulating material 102 and the protective element 110.

Figure 10:
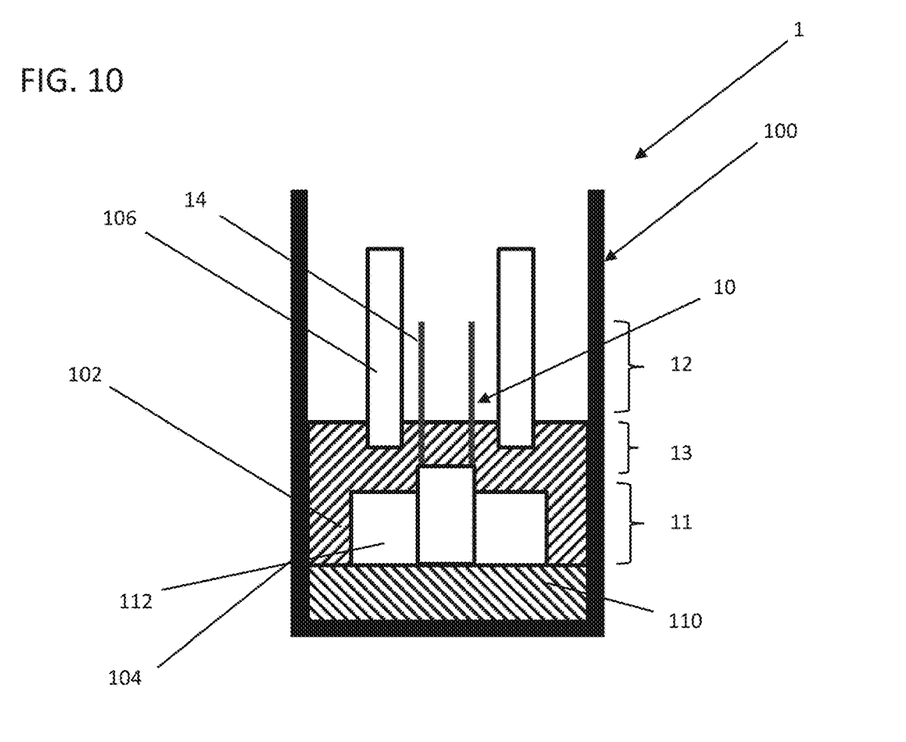
FIG. 10 shows a ninth embodiment of a unit.

FIG. 10 shows a ninth embodiment of a unit 1. This corresponds essentially to the eight embodiment described with reference to FIG. 9, except that it additionally includes a retaining element 106.

The retaining element 106 is here tubular in form and is held in place by the electrically insulating material 102. To this end, a portion of the retaining element 106 is embedded in the electrically insulating material 102. The retaining element 106 is arranged such that it surrounds the connection wires 14 and thereby mechanically supports them. The retaining element 106 may for example consist of a ceramic.

Figure 11:
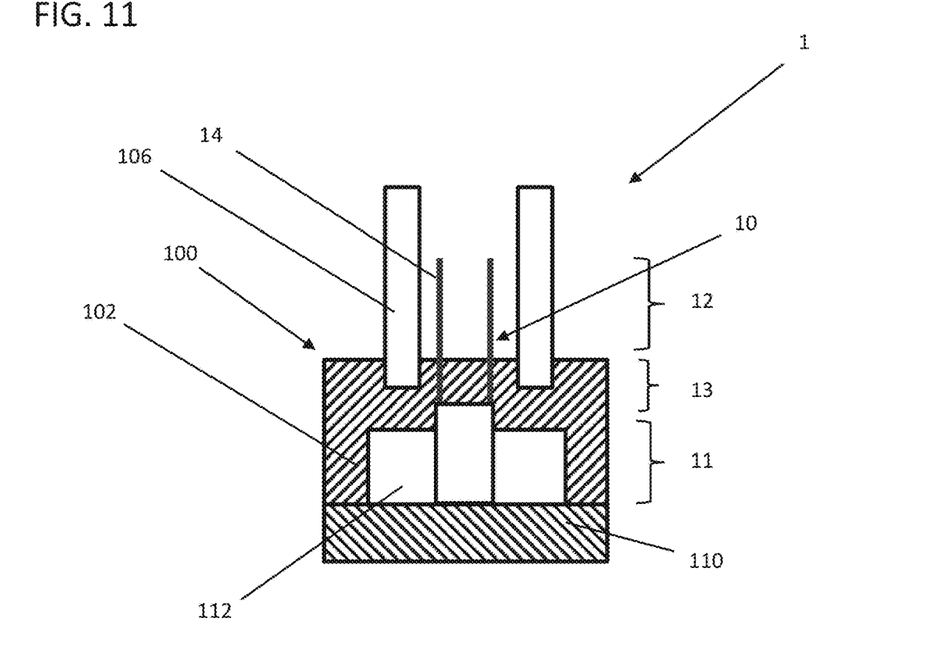
FIG. 11 shows a tenth embodiment of a unit.

FIG. 11 shows a tenth embodiment of a unit 1. This corresponds essentially to the ninth embodiment described with reference to FIG. 10, except that the tenth embodiment does not include a cap 104. The housing 100 thus consists of the electrically insulating material 102, which forms a cup-shaped shaped body, and the protective element 110.

Figure 12:
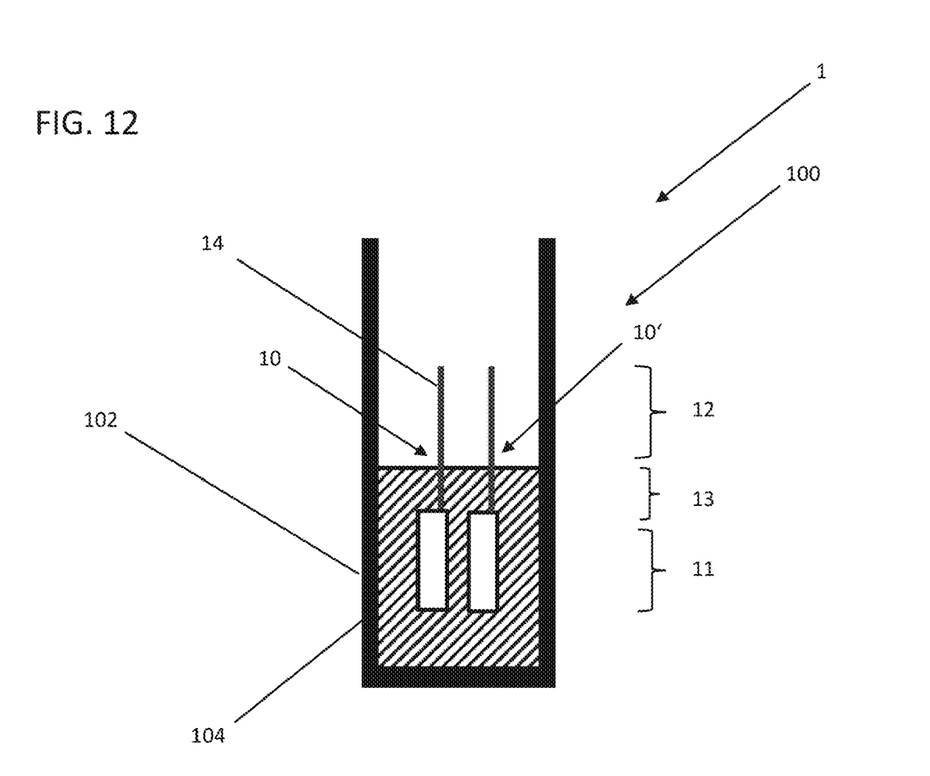
FIG. 12 shows an eleventh embodiment of a unit which includes two electrical functional elements.

FIG. 12 shows an eleventh embodiment of a unit 1 in a section view from the side. This is similar in design to the first embodiment described with reference to FIG. 1, but additionally has a further electrical functional element 10'. This is in this example designed as a heating element and arranged next to the electrical functional element 10, which is designed as a temperature-sensor element.

The unit 1 shown in FIG. 12 may be employed as a thermal flow sensor. In this case, the temperature determined by means of the electrical functional element 10 designed as a temperature-sensor element can be used to regulate a heating current in the further electrical functional element 10' designed as a heating element such that the temperature is kept constant. The more fluid flowing past unit 1, the more heat is transferred to the fluid and the higher the heating current needs to be set for a constant temperature. The volume of fluid flowing past can then accordingly be concluded from the heating current.

LIST OF REFERENCE SIGNS

1 Unit
10 Electrical functional element
10' Further electrical functional element
11 First section
12 Second section
13 Third section
14 Connection wire
16 Non-conducting substrate
18 Electrically conductive element
20 Contact point
22 Covering material
100 Housing 102 Electrically insulating material
104 Cap
106 Retaining element
108 Protective tube
110 Protective element
112 Cavity

What is claimed is:

1. A unit for uses above 700° C., comprising:
a housing; and
at least one electrical functional element having a non-conducting substrate, an electrically conductive element, and at least one connection wire or pad,
wherein the at least one electrical functional element has a first section within the housing and shielded from a local environment by the housing, wherein the at least one electrical functional element has a second section that includes at least a portion of the at least one connection wire or pad that is accessible externally to the housing, wherein the at least one electrical functional element includes a third section that is between the first and second sections, the third section being embedded in an electrically insulating material of the housing, wherein the electrically insulating material seals off the housing from the at least one electrical functional element, and wherein the electrically insulating material is selected from a group consisting of a glass, a glass ceramic, and a combination or a composite of glass and glass ceramic;
a physical and/or chemical bond at an interface between the electrically insulating material and the at least one electrical functional element; and
at least one retaining element configured to support the at least one connection wire.

2. The unit of claim 1, wherein the housing includes a cap made of temperature-resistant material that at least partially surrounds the electrically insulating material.

3. The unit of claim 2, wherein the temperature-resistant material is selected from a group consisting of temperature-resistant steel, temperature-resistant steel alloy, a temperature-resistant ceramic, alloy 600, steel 1.4762, $Al_2O_3$ ceramic.

4. The unit of claim 1, wherein the housing includes a protective tube made of a temperature-resistant material that surrounds at least a portion of the second section, wherein the protective tube is connected to a cap of the housing.

5. The unit of claim 4, wherein the temperature-resistant material is selected from a group consisting of temperature-resistant steel, temperature-resistant steel alloy, a temperature-resistant ceramic, alloy 600, steel 1.4762, $Al_2O_3$ ceramic.

6. The unit of claim 1, wherein the housing includes a protective element made of a material selected from a group consisting of glass, glass ceramic, ceramic, and any combinations thereof.

7. The unit of claim 1, wherein the first section is in a cavity of the housing, wherein the cavity is evacuated or filled with an inert gas.

8. The unit of claim 7, wherein the cavity has walls comprising the electrically insulating material and/or a protective element.

9. The unit of claim 1, further comprising a covering material that is different from the electrically insulating material, the covering material being configured to cover the electrically conducting element and/or an electrical contact point between the at least one connection wire or pad and the electrically conductive element.

10. The unit of claim 1, wherein the first section is embedded in an entirety in the electrically insulating material.

11. The unit of claim 1, further comprising an electrical contact point between the at least one connection wire or pad and the electrically conductive element, the electrical contact point is within the third section and embedded in the electrically insulating material.

12. The unit of claim 1, wherein the at least one retaining element is made of the same material as the electrically insulating material and is configured as a single unit therewith.

13. The unit of claim 1, wherein the at least one retaining element is made a material selected from a group consisting of glass, glass ceramic, and ceramic, wherein the at least one retaining element is partially embedded in the electrically insulating material and held in place by the electrically insulating material.

14. The unit of claim 1, wherein the electrically insulating material has a coefficient of thermal expansion that is matched to a coefficient of thermal expansion of the at least one electrical functional element.

15. The unit of claim 1, wherein the electrically insulating material has a coefficient of thermal expansion that differs from a coefficient of thermal expansion of the at least one electrical functional element by less than $5 \cdot 10^{-6}$/K.

16. The unit of claim 1, wherein the electrically insulating material is a glass ceramic, comprising:
$La_2O_3$ greater than 0.3 mol % to less than 5 mol %,
$Nb_2O_5$ 0 mol % to 9 mol %,
$Ta_2O_5$ 0 mol % to 7 mol %,
where $\Sigma(A_2O_5)$ is greater than 0.2 mol % to 9 mol %,
where A is an element is an oxidation state V+ and comprises an element selected from a group consisting of Nb, Ta, P, and combinations thereof.

17. The unit of claim 1, wherein the at least one electrical functional element is an element selected from a group consisting of: a temperature-sensor element comprising a ceramic substrate and a structured resistance layer arranged thereon; a heating element; and a temperature-sensor element and a heating element when the unit is a thermal flow meter.

18. A unit for uses above 700° C., comprising:
a housing; and
at least one electrical functional element having a non-conducting substrate, an electrically conductive element, and at least one connection wire or pad,
wherein the at least one electrical functional element has a first section within the housing and shielded from a local environment by the housing, wherein the at least one electrical functional element has a second section that includes at least a portion of the at least one connection wire or pad that is accessible externally to the housing, wherein the at least one electrical functional element includes a third section that is between the first and second sections, the third section being embedded in an electrically insulating material of the housing, wherein the electrically insulating material seals off the housing from the at least one electrical functional element, and wherein the electrically insulating material is selected from a group consisting of a glass, a glass ceramic, and a combination or a composite of glass and glass ceramic; and
a physical and/or chemical bond at an interface between the electrically insulating material and the at least one electrical functional element, wherein the first section is in a cavity of the housing, wherein the cavity is evacuated or filled with an inert gas.

19. The unit of claim 18, wherein the cavity has walls comprising the electrically insulating material and/or a protective element.

20. A unit for uses above 700° C., comprising:
a housing; and
at least one electrical functional element having a non-conducting substrate, an electrically conductive element, and at least one connection wire or pad;
wherein the at least one electrical functional element has a first section within the housing and shielded from a local environment by the housing, wherein the at least one electrical functional element has a second section that includes at least a portion of the at least one connection wire or pad that is accessible externally to the housing, wherein the at least one electrical functional element includes a third section that is between the first and second sections, the third section being embedded in an electrically insulating material of the housing, wherein the electrically insulating material seals off the housing from the at least one electrical functional element, and wherein the electrically insulating material comprises over 70% by weight of a material selected from a group consisting of a glass, a glass ceramic, and a combination of glass and glass ceramic; and
a physical and/or chemical bond at an interface between the electrically insulating material and the at least one electrical functional element that provides a hermetically sealed connection between the electrically insulating material and the at least one electrical functional element by fusing the electrically insulating material onto the electrical functional element.

* * * * *